(12) United States Patent
Nayfeh

(10) Patent No.: US 9,096,432 B2
(45) Date of Patent: Aug. 4, 2015

(54) AURIC ACID ASSISTED SILICON NANOPARTICLE FORMATION METHOD

(75) Inventor: Munir H. Nayfeh, Urbana, IL (US)

(73) Assignee: NanoSi Advanced Technologies, Inc., Champaign, IL (US)

( * ) Notice: Subject to any disclaimer, the term of this patent is extended or adjusted under 35 U.S.C. 154(b) by 0 days.

(21) Appl. No.: 13/363,516

(22) Filed: Feb. 1, 2012

(65) Prior Publication Data

US 2012/0195977 A1 Aug. 2, 2012

Related U.S. Application Data

(60) Provisional application No. 61/438,510, filed on Feb. 1, 2011.

(51) Int. Cl.
| | |
|---|---|
| *A61K 33/24* | (2006.01) |
| *B82Y 30/00* | (2011.01) |
| *B82Y 40/00* | (2011.01) |
| *C01B 33/021* | (2006.01) |

(52) U.S. Cl.
CPC ............... *B82Y 30/00* (2013.01); *B82Y 40/00* (2013.01); *C01B 33/021* (2013.01)

(58) Field of Classification Search
CPC ....... B82Y 30/00; B82Y 40/00; C01B 33/021
See application file for complete search history.

(56) References Cited

U.S. PATENT DOCUMENTS

| | | |
|---|---|---|
| 6,585,947 B1 | 7/2003 | Nayfeh et al. |
| 6,743,406 B2 | 6/2004 | Nayfeh et al. |
| 6,951,666 B2 | 10/2005 | Kodas et al. |
| 7,241,814 B2 | 7/2007 | Sakurai et al. |
| 7,524,528 B2 | 4/2009 | Kodas et al. |
| 7,553,512 B2 | 6/2009 | Kodas et al. |
| 7,575,699 B2 | 8/2009 | Strouse et al. |
| 7,615,169 B2 | 11/2009 | Strouse et al. |
| 2006/0240590 A1 | 10/2006 | Mountziaris et al. |
| 2010/0034986 A1 | 2/2010 | Kodas et al. |
| 2010/0112195 A1 | 5/2010 | Kodas et al. |
| 2010/0120942 A1 | 5/2010 | Ajayan et al. |
| 2010/0129623 A1 | 5/2010 | Johansson et al. |
| 2010/0167914 A1 | 7/2010 | Anderson et al. |
| 2010/0234204 A1 | 9/2010 | Aldwayyan et al. |
| 2010/0255311 A1 | 10/2010 | Lee et al. |
| 2011/0086985 A1 | 4/2011 | Watkins et al. |

OTHER PUBLICATIONS

Scanlon B. 2010. Cheaper, Better Solar Cell is Full of Holes. NREL Newsroom [online]; downloaded from URL<http://www.nrel.gov/news/features/feature_detail.cfm/feature_id=1519?print> on Dec. 6, 2012; 3 pages.*
Kimling J et al. 2006. Turkevich Method for Gold Nanoparticle Synthesis Revisited. J Phys Chem.; 110: 15700-15707.*
Wan et al. Proc. of SPIE. 2008; 7002; 9 pages.*
Zhu et al. NSTI-Nanotech. 2008; 1: 592-595.*
Taurozzi et al. 2010. CEINT/NIST Protocol [online]; downloaded from <URL: https://nanohub.org/groups/gng/File:NIST-CEINT_Dispersion_Protocol.pdf> on Oct. 7, 2014; 10 pages.*
Akcakir, et al., "Detection of Luminiescent Single Ultrasmall Silicon Nanoparticles Using Fluctuation Correlation Sepctroscopy", *Appl. Phys. Lett.* 76(14), Apr. 3, 2000, p. 1857.
Belomoin, G., et al., "Observation of a Magic Discrete Family of Ultrabright Si Nanoparticles", *Appl. Phys. Lett.* 80(5), Feb. 4, 2002, p. 841.
Kurniawan, Fredy, "New Analytical Applications of Gold Nanoparticles", *Dissertation, Sigillum University Ratisbonensis*, Results and Discussions, Continuous Synthesis of Gold Nanoparticles, Surabaya, Indonesia, Mar. 2008, p. 55.

* cited by examiner

*Primary Examiner* — Johann R Richter
*Assistant Examiner* — David Browe
(74) *Attorney, Agent, or Firm* — Greer, Burns & Crain, Ltd.

(57) ABSTRACT

Embodiments of the invention provide, among other things, a method of preparing nanoparticles including silicon nanoparticles. A mixture is prepared that includes auric acid ($HAuCl_4$) and HF. A silicon substrate is exposed to the prepared mixture to treat the silicon substrate. The treated silicon substrate is immersed in an etchant mixture, wherein nanoparticles are formed on a surface of the substrate. The nanoparticles are recovered from the substrate.

13 Claims, 3 Drawing Sheets ically an embodiment of the present invention;

AURIC ACID ASSISTED SILICON NANOPARTICLE FORMATION METHOD

PRIORITY CLAIM AND REFERENCE TO RELATED APPLICATION

This application claims the benefit of U.S. Provisional Application Ser. No. 61/438,510, filed Feb. 1, 2011, under 35 U.S.C. §119.

FIELD OF THE INVENTION

The invention generally concerns nanoparticles, including silicon and other nanoparticles, and methods for forming the same. Example applications of the invention include a wide range of electronic, opto-electronic, and skincare applications.

BACKGROUND OF THE INVENTION

Various methods exist in the art for the production of silicon nanoparticles. Most methods are directed to production of silicon nanoparticles having a wide size distribution, In addition, many prior methods, e.g., laser ablation of silicon material, make recovery of silicon nanoparticles for ex-situ uses difficult. There also exist in the art methods, such as chemical vapor deposition or Si ion implantation, for producing size distributions of silicon nanoparticles, sometimes with small quantities of 1 nm particles, but typically having particles tending toward a 10 nm size and greater. Laser ablation, pyrolosis of gas, and electron beam deposition are example processes that have been used in the art to produce silicon nanoparticles, but these processes generally produce small quantities of particles, and in forms that are not readily accessed for subsequent processes.

The state of the art was advanced by methods for the controlled production of silicon nanoparticles that also permitted their recovery and ex-situ use. Silicon nanoparticles of ~1 nm diameter have been produced in quantity with high uniformity of the specific 1 nm size. Such methods include, e.g., Nayfeh et al. U.S. Pat. No. 6,585,947, entitled METHOD FOR PRODUCING SILICON NANOPARTICLES; and Nayfeh et al. U.S. Published Patent Application, publication number 20020070121, published on Jul. 13, 2002 and entitled FAMILY OF DISCRETELY SIZED NANOPARTICLES AND METHOD FOR PRODUCING THE SAME (both of which are incorporated herein by reference). See also, e.g., Akcakir et al, "Detection of luminescent single ultrasmall silicon nanoparticles using fluctuation correlation spectroscopy", Appl. Phys. Lett. 76 (14), p. 1857 (Apr. 3, 2000) (incorporated herein by reference). The family includes 1 (blue emitting), 1.67 (green emitting), 2.15 (yellow emitting), 2.9 (red emitting) and 3.7 nm (infrared emitting). See, also, e.g., G. Belomoin et at "Observation of a magic discrete family of ultrabright Si nanoparticles," Appl. Phys. Lett. 80(5), p 841 (Feb. 4, 2002) (incorporated herein by reference).

SUMMARY OF THE INVENTION

Embodiments of the invention provide, among other things, a method of preparing nanoparticles including silicon nanoparticles. A mixture is prepared that includes auric acid ($HAuCl_4$) and hydrofluoric acid (HF). A silicon substrate is exposed to the prepared mixture to treat the silicon substrate. The treated silicon substrate is immersed in an etchant mixture, e.g., of $HF/H_2O_2$, wherein the nanoparticles are formed on a surface of the substrate. The nanoparticles are recovered from the substrate. The resulting nanoparticles can include other nanoparticles, including gold nanoparticles, platinum nanoparticles, gold-platinum alloy nanoparticles, silicon nanoparticles, gold nanoparticles decorated with (attached to) silicon nanoparticles, platinum nanoparticles decorated with (attached to) silicon nanoparticles, and/or gold-platinum alloy nanoparticles decorated with (attached to) silicon nanoparticles in particular embodiments of the invention.

BRIEF DESCRIPTION OF THE. DRAWINGS

DETAILED DESCRIPTION

Embodiments of the invention provide, among other things, nanoparticle formation methods that can rapidly produce substantial quantities of nanoparticles including silicon nanoparticles, which are readily recoverable for subsequent uses. Methods of the invention use etching of silicon source material using gold-based. auric acid ($HAuCl_4$), HF, and $H_2O_2$ to form Si nanoparticles. In embodiments of the invention, the silicon source material is silicon wafers. A preferred method includes preparing a mixture including auric acid and an HF solution, exposing a silicon substrate to the mixture to treat the silicon substrate, and immersing the treated silicon substrate in a mixture of $HF/H_2O_2$, to form nanoparticles on a surface of the substrate.

Embodiments of the invention provide silicon nanoparticle formation processes that proceed to completion quickly, permitting formation of large quantities of nanoparticles. Nanoparticles as used herein refer to particles having a size of sub 3 nm in diameter. The rapidity of preferred embodiments makes the formation methods especially well-suited to commercial manufacturing processes. Example methods of the invention can provide silicon nanoparticles as well as additional nanoparticles including gold nanoparticles, platinum nanoparticles, gold-platinum alloy nanoparticles, gold nanoparticles decorated with (attached to) silicon nanoparticles, platinum nanoparticles decorated with (attached to) silicon nanoparticles, and gold-platinum alloy nanoparticles decorated with (attached to) silicon nanoparticles. Nanomaterials including such nanoparticles can also be provided according to embodiments of the present invention.

Preferred embodiments will now be discussed with respect to the drawings. The drawings include schematic figures that are not to scale, which will he fully understood by skilled artisans with reference to the accompanying description. Features may be exaggerated for purposes of illustration. From the preferred embodiments, artisans will recognize additional features and broader aspects of the invention.

A preferred embodiment of the invention is a chemical etching process utilizing auric acid, HF, and $H_2O_2$ on a substrate of silicon source material ("silicon substrate"), e.g., silicon wafers, to form fluorescent silicon nanoparticles and other valuable nanoparticles. Compared to the anodization. in HF/H$_2$O$_2$ used in U.S. Pat. No. 6,585,947, present example chemical etching processes run to completion in a shorter time (can be less than one third of the time), consume no electrical power, use less raw silicon wafer material, and are more efficient. The '947 Patent produces highly uniform quantities of 1 nm particles, whereas example methods of the present process can produce large quantities of 3 nm nanoparticles.

Figure 1:
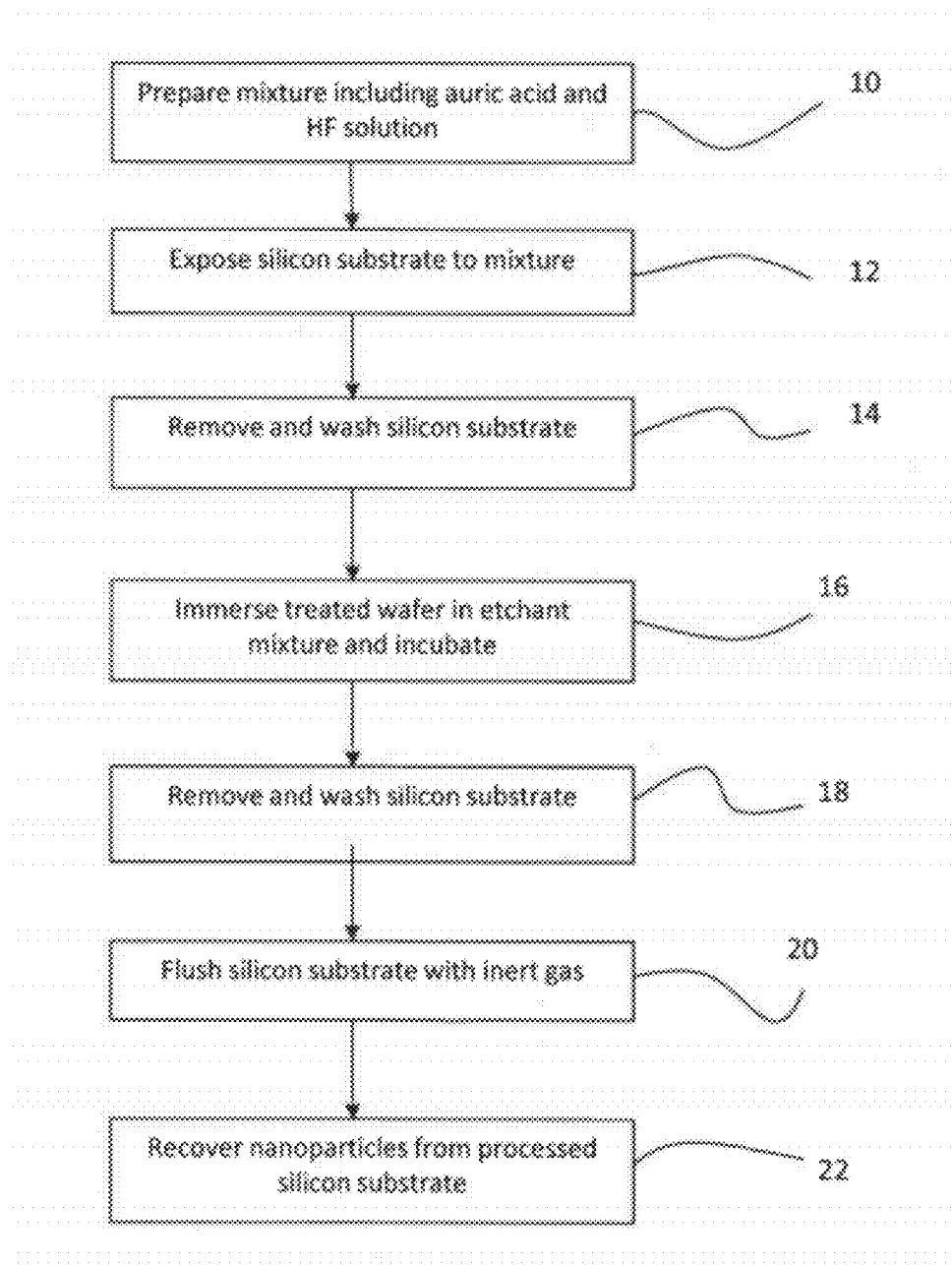
FIG. 1 shows an example process for forming silicon nanoparticles according to an embodiment of the present invention.

FIG. 1 shows an example method for preparing nanoparticles. First, a mixture is prepared 10 that includes auric acid and a hydrofluoric acid (HF) solution. For example, auric acid, HF, and water (e.g., de-ionized or distilled water) can be mixed to provide the prepared mixture.

The auric acid/HF mixture can include additional materials to provide additional types of nanoparticles or to obtain certain benefits. As a nonlimiting example, a citrate salt such as sodium citrate can be added or otherwise mixed with the prepared mixture to limit or prevent agglomeration of resulting nanoparticles, and to provide stability for the silicon nanoparticles in aqueous solutions. Also, hydro chloric platinic acid can be added to the prepared mixture to further produce platinum nanoparticles and metal alloy gold-platinum nanoparticles. The properties of the alloy nanoparticles can be tuned by tuning the branching ratios of the concentrations of the auric acid and the hydro chloro platinic acid.

A silicon substrate is now exposed to the prepared mixture 12, for example, by being immersed (fully or partially) in the mixture. For example, the silicon substrate can be a single crystal or powder. A nonlimiting example silicon substrate is a silicon wafer of rectangular or irregular shape, though other silicon substrates are possible, including powder. A typical duration for the treatment is about 2-3 minutes.

The wafer preferably is then removed from the prepared mixture and washed in de-ionized water 14, or alternatively distilled water, or isopropynol alcohol, This step is followed by another step in which the treated silicon substrate is immersed (fully or partially) in an etchant mixture 16, e.g., a mix of HF/H$_2$O$_2$ for etching the nanoparticles. The silicon substrate can be immersed in the etchant mixture using similar or different techniques as for the immersion into the mixture in step 12. The silicon substrate is incubated in the etchant mixture for a short period, e.g., 15-30 seconds. In example embodiments of the invention, this immersion etches the silicon substrate without a need for providing electrical current. Silicon and other nanoparticles (e.g., gold, gold-platinum alloy, etc.) form on the surface of the silicon substrate during the etchant mixture immersion 16. The silicon substrate is then removed and washed 18, e.g., in isopropyl alcohol. In example embodiments, the silicon substrate is also flushed with inert gas 20.

The nanoparticles are then recovered from the processed silicon substrate 22. For example, sonication can be used to recover the nanoparticles from the surface of the silicon substrate in a solvent of choice. The particles can additionally or alternatively be recovered in isopropyl or other organic solvent, or water. The nanoparticles can then be recovered, delivered and processed further into thin films, solids, coatings, etc., according to application. Resulting prepared nanoparticles from particular example processes employing an auric acid/HF solution include silicon nanoparticles, gold nanoparticles, and gold nanoparticles decorated with (attached to) silicon nanoparticles. Resulting prepared nanoparticles from example processes further employing hydro chloro platinic acid in the prepared mixture include silicon nanoparticles, gold nanoparticles, platinum nanoparticles, gold-platinum alloy nanoparticles, gold nanoparticles decorated with (attached to) silicon nanoparticles, platinum nanoparticles decorated with (attached to) silicon nanoparticles, and gold-platinum alloy nanoparticles decorated with (attached to) silicon nanoparticles.

Experiments concerning the above embodiments will now be discussed. The laboratory scale demonstrations of preferred embodiments will reveal additional features of the invention to artisans.

Experiments concerning a preferred embodiment use a silicon wafer (silicon wafer piece) as a substrate of a silicon source material and use solutions of auric acid, HF, and H$_2$O$_2$ for processing. First, a mixture was prepared by dissolving 0.1518 g of auric acid in 30 ml of de-ionized water. To this solution was added 5 ml of 5% HF solution, and some sodium citrate. The silicon wafer was then exposed to the prepared mixture by being immersed in the prepared mixture for about 2-3 minutes. The silicon wafer was then removed and washed in de-ionized water. The treated silicon wafer was partially immersed in a mix of HF/H$_2$O$_2$, and incubated for 15-30 seconds. Silicon nanoparticles formed on the surface of the silicon wafer during the HF/H$_2$O$_2$ immersion, The silicon wafer was then removed and washed in isopropyl alcohol. When the processed silicon wafer was illuminated with 365 nm from a mercury lamp, red/yellow fluorescence was seen from the silicon wafer with the naked eye.

After the nanoparticles were formed, the wafer sample was washed with isopropyl or de-ionized water, and flushed with inert gas. The etched film is seen by the naked eye as a stain on the immersed portion of the silicon wafer. Under irradiation from commercial incoherent UV mercury lamp at 365 nm, red photoluminescence is observed with the naked eye. The nanoparticles were then recovered from the wafer, by sonication in a water, or isopropanol alcohol, THF, acetone, etc., solvent.

Figure 2:
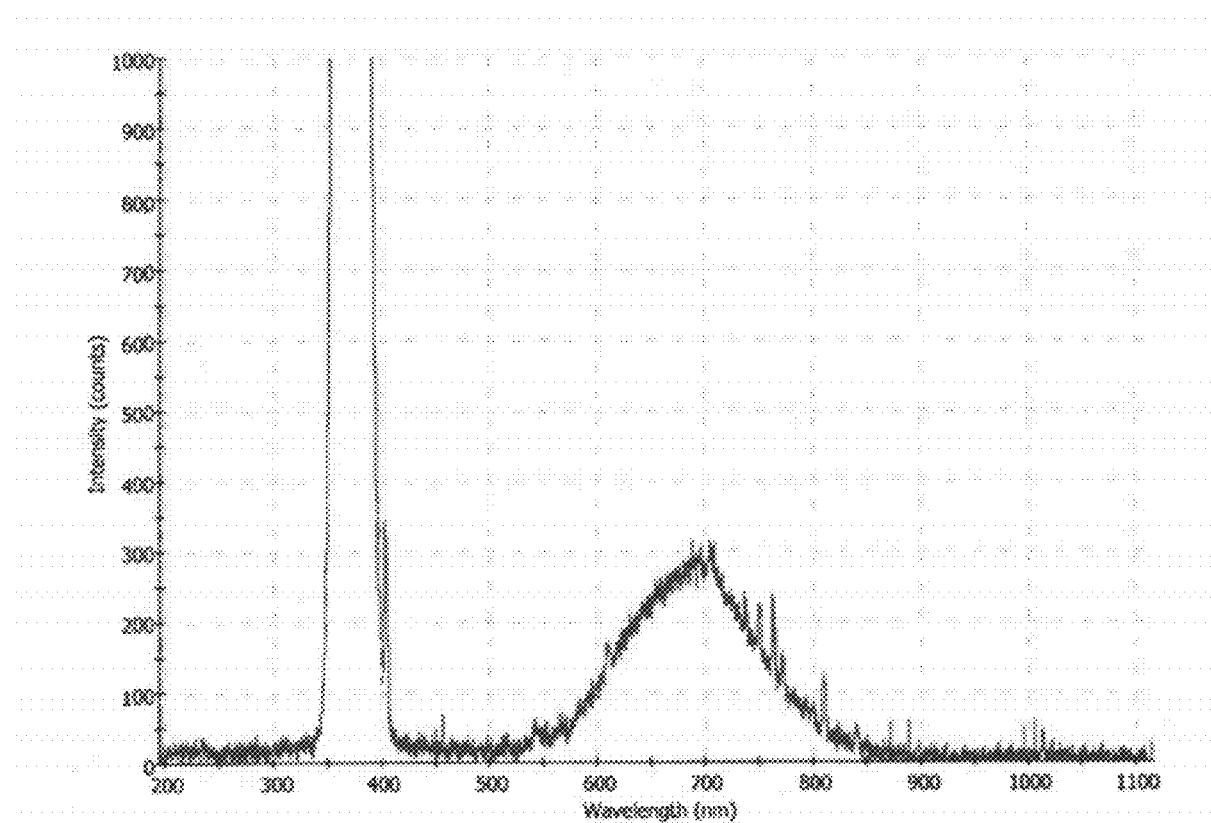
FIG. 2 shows red photoluminescence spectrum (right band) from Si nanoparticle material under 365 nm band (left band) covering the range 575-800 nm.

Under white light, the nanoparticle solution appears brown with the naked eye. Under illumination with 365 nm from a mercury lamp, red/yellow fluorescence is seen from the solution with the naked eye. FIG. 2 shows the photoluminescence spectrum.

Figure 3:
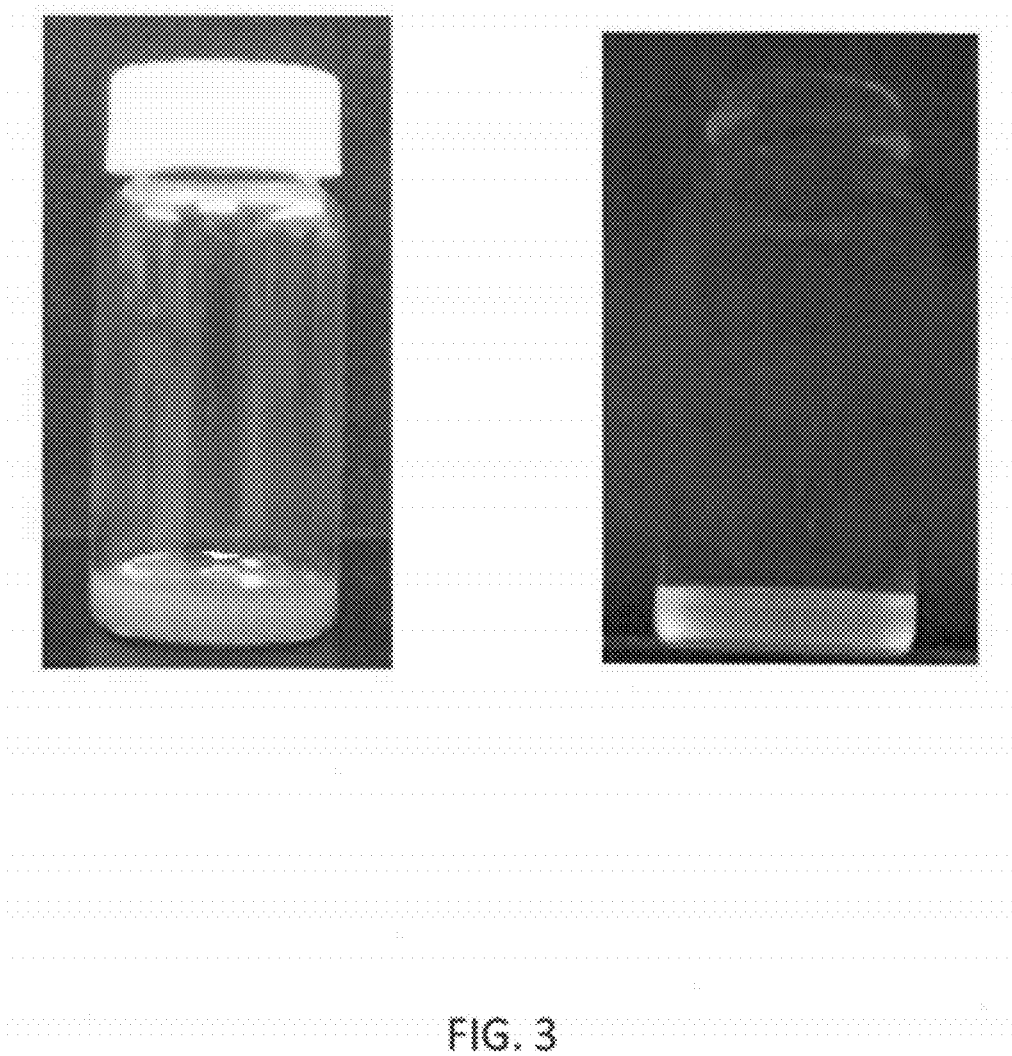
FIG. 3 shows an example nanosolution in room light (left) showing red-brown color of gold nanoparticles, and under UV illumination (right) showing orange-red emission from silicon nanoparticles.

Optical spectroscopy shows formation of gold nanoparticles as a byproduct with a wide size distribution covering the range 10-50 nm in diameter. FIG. 3 shows a photo of the solution in room light (left) as well as the photo of the solution under UV at 365 nm (right), The red-brown color of the solution in room light is indicative of the gold nanoparticle component. The orange-red color of the solution under UV is indicative of the silicon nanoparticle component. Some of these gold particles are decorated with (attached to) the fluorescent silicon nanoparticles, which gives them a glowing look under UV irradiation. The sodium citrate caps the gold nanoparticles and prevents them from agglomeration or getting too big. The citrate salt also provides some stability for the silicon nanoparticles in aqueous solutions.

As explained above, in some example embodiments, hydro chloric platinic acid may be added to the mixture of the auric acid and HE However, the rate using chloro platinic acid is slower, allowing the (gold-based) auric acid to dominate. The concentrations of the two acids are varied to arrive at comparable rates. In such example methods silicon nanoparticles, gold nanoparticles, as well as platinum nanoparticles are produced. In addition, nanoparticles of complex metal alloy gold-platinum (Au—Pt) are produced exhibiting interesting optical activities. The properties of the alloy nanoparticles can be tuned, as indicated above, by tuning the branching ratios of the concentrations of the two acids.

The prepared nanoparticles can be employed in a variety of uses. A nanomaterial can be provided including one or more of these nanoparticles (silicon, gold, platinum, gold-platinum). Nanomaterials can be formed in films, solids, coatings, etc. A nanomaterial including gold nanoparticles decorated with (attached to) silicon nanoparticles is useful for skincare products, as the gold nanoparticles respond strongly to room light while the nanoparticles responds more so to the blue/UV part of the spectrum, providing some complementary benefits.

While various embodiments of the present invention have been shown and described, it should be understood that other modifications, substitutions, and alternatives are apparent to one of ordinary skill in the art.

Such modifications, substitutions, and alternatives can be made without departing from the spirit and scope of the invention, which should be determined from the appended claims.

Various features of the invention are set forth in the appended claims.

What is claimed is:

1. A method of preparing nanoparticles comprising:
    preparing a mixture including auric acid and a hydrofluoric acid (HF) solution;
    exposing a silicon substrate to the prepared mixture to treat the silicon substrate;
    separately to said exposing, immersing the treated silicon substrate in an mixture of HF and $H_2O_2$, wherein the nanoparticles are formed on a surface of the substrate, wherein the nanoparticles include silicon nanoparticles, wherein the silicon nanoparticles have a diameter of 3 nm or less; and
    recovering the nanoparticles from the substrate.

2. The method of claim 1, wherein the nanoparticles further comprise gold nanoparticles;
    further comprising recovering the gold nanoparticles from the substrate.

3. The method of claim 1, wherein said exposing comprises at least partially immersing the silicon substrate in the prepared mixture.

4. The method of claim 1, further comprising:
    after said exposing and before said immersing, removing the treated silicon substrate from the mixture and washing the silicon substrate.

5. The method of claim 1, wherein the silicon substrate comprises a silicon wafer.

6. The method of claim 1, wherein said recovering comprises:
    removing the immersed silicon substrate from the mixture of HF and $H_2O_2$;
    sonicating the silicon substrate in a solvent.

7. The method of claim 1, wherein the prepared mixture further comprises a citrate salt.

8. The method of claim 7, wherein the prepared mixture comprises sodium citrate.

9. The method of claim 1, wherein the prepared mixture further comprises hydro chloro platinic acid.

10. The method of claim 9, wherein the nanoparticles further comprise gold nanoparticles.

11. The method of claim 10, wherein the nanoparticles further comprises gold-platinum alloy nanoparticles.

12. The method of claim 11, wherein the nanoparticles further comprises one or more of gold nanoparticles decorated with (attached to) silicon nanoparticles, platinum nanoparticles decorated with (attached to) silicon nanoparticles, and gold-platinum alloy nanoparticles decorated with (attached to) silicon nanoparticles.

13. A method for providing a nanomaterial comprising nanoparticles, the method comprising:
    preparing a mixture including auric acid, a citrate salt, and a solution of hydrofluoric acid (HF) and water;
    immersing a silicon substrate into the prepared mixture to treat the silicon substrate;
    removing the treated silicon substrate from the prepared mixture and washing the silicon substrate;
    immersing the treated silicon substrate in a mixture of HF and $H_2O_2$, wherein silicon and gold nanoparticles are formed on a surface of the substrate, wherein the silicone nanoparticles have a diameter of 3 nm or less; and
    recovering the silicon and gold nanoparticles from the substrate;
    forming the silicon and gold nanoparticles into a film, a solid, or a coating.

* * * * *

UNITED STATES PATENT AND TRADEMARK OFFICE
CERTIFICATE OF CORRECTION

PATENT NO. : 9,096,432 B2
APPLICATION NO. : 13/363516
DATED : August 4, 2015
INVENTOR(S) : Munir H. Nayfeh Page 1 of 1

It is certified that error appears in the above-identified patent and that said Letters Patent is hereby corrected as shown below:

In the Specification:

Col. 1, line 23  After "distribution", please insert a --.--.

Col. 1, line 25  Please delete the "." after "ex-situ".

Col. 1, line 54  Please delete "at" and insert --al.-- therefor.

Col. 2, line 28  Please delete "nanoparticie" and insert --nanoparticle-- therefor.

Col. 2, line 40  Please delete "nanoparticie" and insert --nanoparticle-- therefor.

Col. 2, line 58  Before "fully", please delete "he" and insert --be-- therefor.

Col. 3, line 35  After "alcohol", please insert a --.--.

Col. 4, line 55  Please delete "HE" and insert --HF.-- therefor.

Signed and Sealed this
Twenty-sixth Day of July, 2016

Michelle K. Lee
*Director of the United States Patent and Trademark Office*